United States Patent

Stotko

[11] 3,816,383
[45] June 11, 1974

[54] SEPARATION OF OLEFIN POLYMERS

[75] Inventor: Norbert Anthony Stotko, Denver, Colo.

[73] Assignee: National Petro-Chemicals Corporation, New York, N.Y.

[22] Filed: May 1, 1972

[21] Appl. No.: 249,328

[52] U.S. Cl......... 260/94.9 F, 260/93.7, 260/94.9 P
[51] Int. Cl............................. C08f 1/88, C08f 3/06
[58] Field of Search........... 260/94.9 F, 94.9 P, 93.7

[56] References Cited
UNITED STATES PATENTS
3,635,919   1/1972   Goffinet, Jr. .................. 260/94.9 P
FOREIGN PATENTS OR APPLICATIONS
1,039,911   8/1966   Great Britain.................. 260/94.9 F Primary Examiner—Joseph L. Schofer
Assistant Examiner—A. Holler
Attorney, Agent, or Firm—Allen A. Meyer, Jr.

[57] ABSTRACT

Process for the separation of olefin polymers from product slurries removed from a polymerization zone, in which the slurry is passed directly into a cyclone separator, a portion of the underflow from the separator being taken off for recovery of the solid polymer and the overflow therefrom being combined with the residual portion of the underflow and recycled to the polymerization reactor. A pressure differential is maintained between the take-off and recycle points in the polymerization reactor whereby to maintain continual fluid flow through the separator. Recycle of the diluent-rich overflow from the cyclone avoids blockage of the composite recycle stream.

4 Claims, 1 Drawing Figure

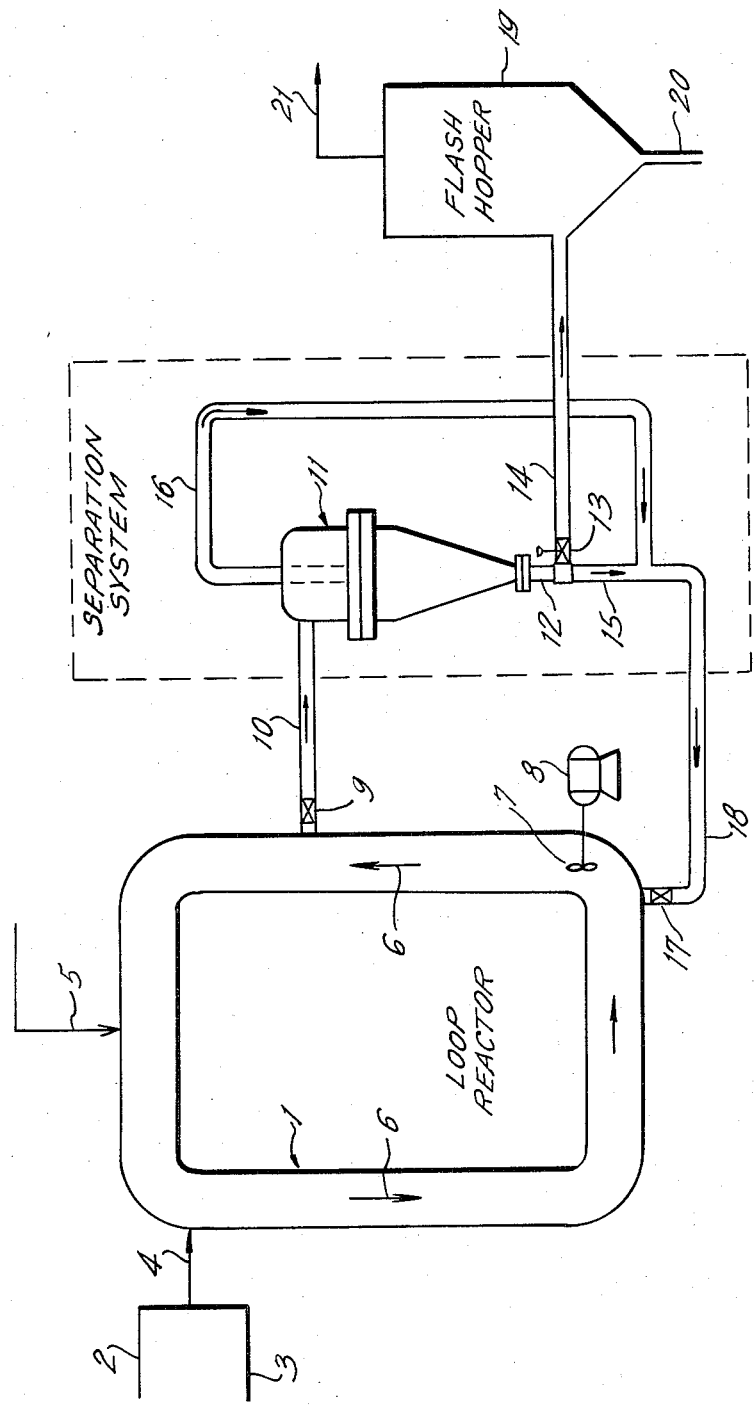

3,816,383

SEPARATION OF OLEFIN POLYMERS

BACKGROUND OF THE INVENTION

In the polymerization of olefins in accordance with the particle form polymerization process, the effluent from the polymerization reactor is in the form of a slurry of the solid olefin polymer in a diluent. Many methods have previously been proposed for removal of the product slurry from the polymerization reactor and subsequent separation of the liquid diluent from the solid polymer. Among the objects of the present invention is the provision of an improved process for removing the polymer slurry from the polymerization reactor and separating the solid polymer from a major portion of the diluent, thereby facilitating and simplifying subsequent recovery of the desired product.

It is known to carry out the particle form polymerization of ethylene, for example, in a continuous loop reactor from which the product slurry may be withdrawn through a settling leg or legs which are periodically discharged. The use of such a system poses certain problems in view of the relative mechanical complexity of the settling legs and the undesirable pressure pulses which are created in the loop reactor by the periodic discharge of the settling legs.

A process has now been discovered by which the product slurry may be readily and efficiently removed from the polymerization reactor without the use of the aforesaid settling legs and without their concomitant disadvantages, and the solid polymer simultaneously separated in major part from the liquid diluent and recovered in concentrated form facilitating efficient and economical after-treatment. These and other objects of the invention will be apparent from the following detailed description, taken in connection with the attached drawing in which the sole figure is a diagrammatic flow sheet representing a portion of a reaction system incorporating the improved separation process hereof.

SUMMARY OF THE INVENTION

In accordance herewith, a process for the polymerization of an olefin is provided in which a slurry of the solid olefin polymer is produced within a polymerization zone, the slurry is removed from the zone, and the solid polymer is separated from liquid diluent and any unreacted monomer admixed therewith, characterized by separating the solid polymer by directly passing the product slurry through a separation zone, removing an overflow stream from the separation zone concentrated in the liquid diluent, removing an underflow stream from the separation zone concentrated in the solid polymer, taking off a portion of the underflow for recovery of the solid polymer, combining the overflow with the residual underflow, and recycling the resulting mixture to the polymerization zone. By thus providing a by-pass arrangement in a cyclone separator or other separation zone, smooth and continual flow of the product slurry from the reactor and through the separation system is insured.

In accordance with a further feature of the invention, the cyclone separator or other separation zone utilized is so connected to the polymerization reactor as to maintain a pressure gradient between the reactor region from which the polymer slurry is removed and that to which the recycle mixture is returned, the pressure gradient thus providing a motive force for feeding and recycling the respective streams to and through the separation zone.

The use of a cyclone separator in the separation of solid olefin polymer from a polymerization reactor effluent slurry is disclosed in Payne et al. U.S. Pat. No. 3,418,305, granted Dec. 24, 1968. This patent does not, however, suggesting by-passing the overflow from such a separator and recycling the same together with a portion of the separator underflow to avoid blockage and maintain a constant volumetric flow through the separation system. Nor does it suggest connecting the cyclone separator across the polymerization reactor in such a manner as to create a pressure gradient between the take-off from or recycle to the reactor, which gradient motivates the fluid stream through the separation system. It is these features, together with elimination of the use of the settling legs commonly employed for removing olefin polymer product slurries produced in the particle form polymerization process, which characterize the present invention.

PREFERRED EMBODIMENTS OF THE INVENTION

The process hereof may be employed in the separation of any olefin polymer from a slurry containing the same in a suitable liquid diluent as formed in the well known particle form technique for the polymerization of olefin monomers. The present separation technique is particularly useful in conjunction with olefin polymerizations carried out in continuous loop reactors such as described, for example, in Norwood U.S. Pat. No. 3,248,179. It may also be used in cooperation with any of the various polymer drying or diluent separation and recovery or recycling operations disclosed, for example, in Scoggin et al. U.S. Pat. No. 3,152,872, granted Oct. 13, 1964, Dietz U.S. Pat. No. 3,318,857, granted on May 9, 1967, or the aforesaid Payne et al. U.S. Pat. No. 3,418,305.

The present invention is useful in the separation and recovery of polymers of any suitable $\alpha$-olefins formed in accordance with the known low pressure polymerization techniques carried out in the presence of chromium oxide, organometallic or other catalyst systems. Preferably, the process is utilized in the separation of ethylene polymers formed over organometallic catalysts. Alternatively, however, it may be used in connection with the polymerization of any of the monomers, employing any of the catalysts, or in the presence of the diluents, modifiers or the like, and utilizing the known reaction temperatures, pressures and other parameters, which are commonly used in the art. Such compositions and process conditions with which the separation process of this invention may be used are described, for example, in the above-noted patents which, it will be understood, are cited as illustrative only.

In a particularly preferred form of the invention, illustrated in the attached drawing, a loop reactor 1 is illustrated into which an olefin monomer stream 2 and a diluent stream 3 are fed through a line 4. A catalyst, suitably introduced as a suspension in the diluent, is also introduced into the loop reactor 1 through a separate line 5. The reaction mixture is continuously circulated through the reactor, in the direction designated by arrows 6, by an impeller 7 connected through an appropriate seal and driven by a motor 8. The temperature and pressure conditions within the loop reactor are suitably controlled so as to effect polymerization of the olefin monomer continuously circulated therethrough and as to form a slurry of the desired solid olefin polymer within the reactor.

In accordance with this invention the polymer slurry is removed from the loop reactor 1 through a valved (9) line 10 and into and through a cyclone separator 11. The separator acts as a liquid cyclone thickener, the relatively large solid polymer particles tending to be separated as an underflow stream and the liquid diluent together with any residual monomer or other fluids and fines tending to separate as an overflow stream. The solid polymer-enriched underflow is removed as stream 12, a portion of which is taken off through valved (13) line 14 for recovery and the residual portion of which is fed through line 15 for recycle. The overflow stream, on the other hand, is removed from the separator through a by-pass line 16, combined with the residual underflow in line 15, and recycled to reactor 1 through a valved (17) line 18. It is this by-pass line which, as indicated hereinabove, insures a constant volumetric flow through the cyclone separator and prevents blockage thereof by the high solids content slurries fed therethrough.

The product slurry removed through line 14 is enriched in the desired solid polymer product. For example, polyethylene-containing slurries have solids contents of from about 40 to 65 percent by weight may be thus separated and removed for subsequent drying and recovery. By utilizing the separation technique hereof, it is possible to decrease subsequent after-treatment while simultaneously effecting at least a partial classification of the desired polymer. The concentrated polymer product is then conventionally treated, e.g., in a flash hopper 19, the solid polymer being recovered through line 20 and vaporized diluents being removed through line 21 (see, for example, the aforesaid Scoggin et al. U. S. Pat. No. 3,152,872).

It should be further noted that the slurry take-off line 10 and the recycle line 18 are connected to loop reactor 1 downstream and upstream, respectively, of the impeller 7 for the reaction mixture. The pressure drop across this pump provides a pressure gradient serving to motivate fluid flow through line 10 into the cyclone separator 11, through the separation system, and through return or recycle line 18. Employing an axial impeller operating at 20,000 G.P.M. at 9.3 psi pressure, gradients or heads of from about 5 to 10 psi may thus be established.

In the manner described hereinabove, polymer slurries removed from the loop reactor 1 through line 10 having solids contents of about 25 weight percent may be readily concentrated to product slurries recovered through line 14 having solids contents of up to about 65 weight percent. Yet such is accomplished, as indicated hereinabove, without the use of settling legs, without blockage problems, and without the need for external pumping means (the pressure differentials within the loop reactor itself motivating the separation).

It will be understood that various changes may be made in the preferred embodiment of the separation process described herein without departing from the scope of the present invention. Accordingly, the preceding description is intended as illustrative only and not as limiting.

What is claimed is:

1. In a process for the polymerization of an olefin in which a slurry of the solid olefin polymer is produced within a polymerization zone, the slurry is removed from the zone, and the solid polymer is separated from a liquid diluent and any unreacted monomer, the improvement comprising:
   a. separating the solid polymer by directly passing the product slurry through a separation zone;
   b. removing an overflow stream from the separation zone concentrated in the liquid diluent;
   c. removing an underflow stream from the separation zone concentrated in the solid polymer;
   d. separating the underflow stream into a first stream and a second stream each having the same composition comprising a slurry of said polymer in liquid diluent;
   e. recovering solid polymer from said first stream;
   f. combining the overflow stream with said second stream; and
   g. recycling the combined streams of (f) to the polymerization zone.

2. The process of claim 1, wherein a pressure gradient is maintained in the polymerization zone between the region from which the polymer slurry is removed and that to which the recycle mixture is returned, the pressure gradient effecting feed and recycle of the respective streams to and through the separation zone.

3. The process of claim 2, wherein the pressure gradient is from 5 to 10 psi.

4. The process of claim 1 for the polymerization of ethylene, in which the polymerization is carried out in a continuous loop reaction zone and in which a polyethylene-containing product stream is recovered in step (*d*) having a solids content of from 40 to 65 percent by weight.

* * * * *